United States Patent [19]

Sonobe

[11] Patent Number: 4,969,740
[45] Date of Patent: Nov. 13, 1990

[54] SPECTROMETER

[75] Inventor: Yoji Sonobe, Machida, Japan

[73] Assignee: Anritsu Corporation, Tokyo, Japan

[21] Appl. No.: 354,151

[22] Filed: May 19, 1989

[30] Foreign Application Priority Data

May 24, 1988 [JP] Japan .............................. 63-126522
May 2, 1989 [JP] Japan ................................ 1-112138

[51] Int. Cl.$^5$ ............................................. G01J 3/18
[52] U.S. Cl. .................................. 356/326; 356/328;
356/308; 356/334
[58] Field of Search .............. 356/300, 305, 308, 309,
356/326, 328, 331, 332, 334

[56] References Cited

U.S. PATENT DOCUMENTS

| 2,723,589 | 11/1955 | Bullock et al. | 356/308 |
| 4,643,572 | 2/1987 | Sonobe et al. | 356/334 |
| 4,743,114 | 5/1988 | Crane, Jr. | 356/346 |
| 4,758,086 | 7/1988 | Sonobe et al. | 356/327 |

FOREIGN PATENT DOCUMENTS 0207498 7/1986 European Pat. Off.
57-153226 9/1982 Japan.

OTHER PUBLICATIONS

Fredrickson, *The Review of Scientific Instruments*, vol. 44, No. 1, Jan. 1973, pp. 52-55.

*Primary Examiner*—F. L. Evans
*Attorney, Agent, or Firm*—Frishauf, Holtz, Goodman & Woodward

[57] ABSTRACT

A dispersion-type spectral element designed for reflecting an incident sample light is rotated by a drive mechanism. The sample light reflected by the element is applied to a sample-light receiving device. The device converts the light into a first signal representing the intensity of the sample light. Reference light consisting of beams having various wavelengths over a broad range is supplied from a reference light source to the spectral element. Further, standard light consisting of one beam of a known wavelength is also supplied from a standard light source to the spectral element. The reference light reflected by the element is applied to a reference-light receiving device. The reference-light receiving device converts the reference light into a second signal representing the intensity of the light. An etalon is located in the optical path between the spectral element and the reference-light receiving device. The standard light reflected by the element is applied to the standard-light receiving device. The standard-light receiving device converts the standard light into a third signal representing the intensity of the standard light. An arithmetic unit receives the first, second, and third signals separately, and obtains from the second and third signals a wavelength scale used for calculating from the first signal the wavelength of the sample light.

13 Claims, 17 Drawing Sheets

TRANSMITTANCE $\alpha$ $$\alpha = \frac{I_0}{I_1} = \frac{1}{1 + A\sin^2(\delta/2)}$$

$$A = \frac{4R}{(1-R)^2}$$

$$\delta = \frac{4\pi n d \cos\theta}{\lambda}$$

R : REFLECTANCE,
n : REFRACTIVE INDEX,
d : THICKNESS,
$\theta$ : ANGLE OF INCLINATION,
$\lambda$ : WAVELENGTH

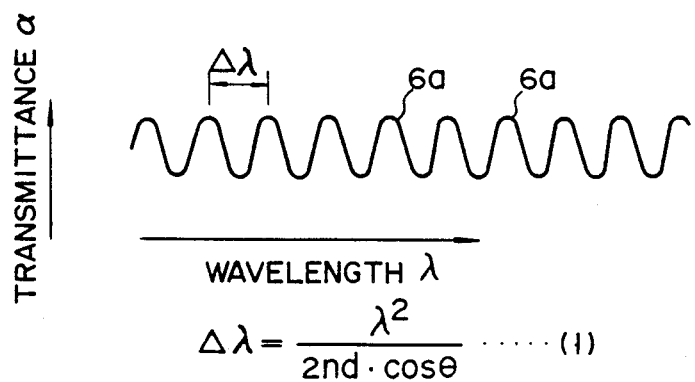
$$\Delta\lambda = \frac{\lambda^2}{2nd \cdot \cos\theta} \quad \cdots (1)$$
F I G. 3
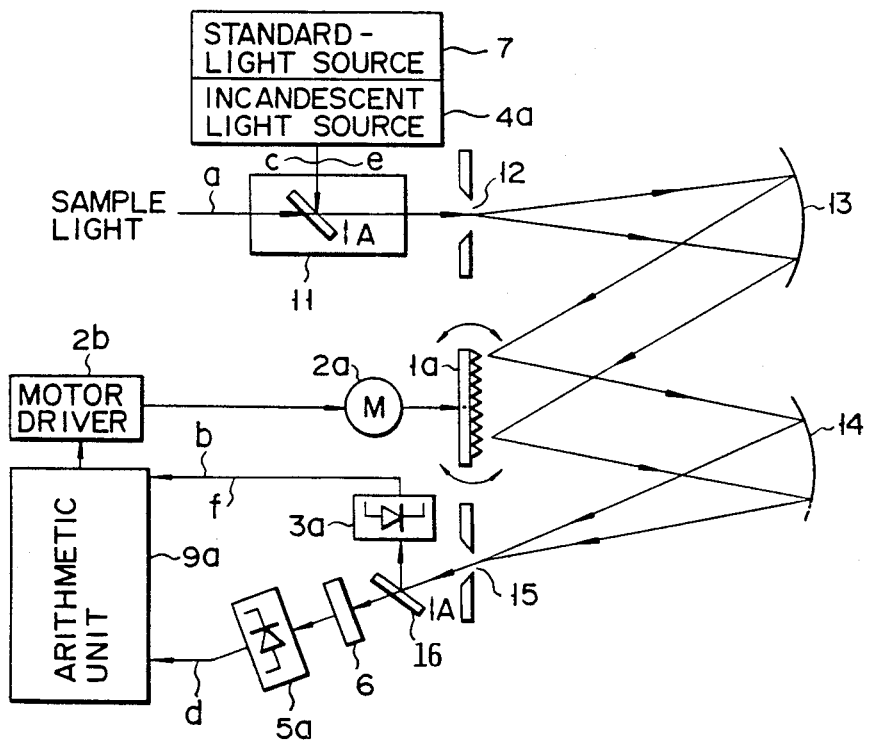
F I G. 4

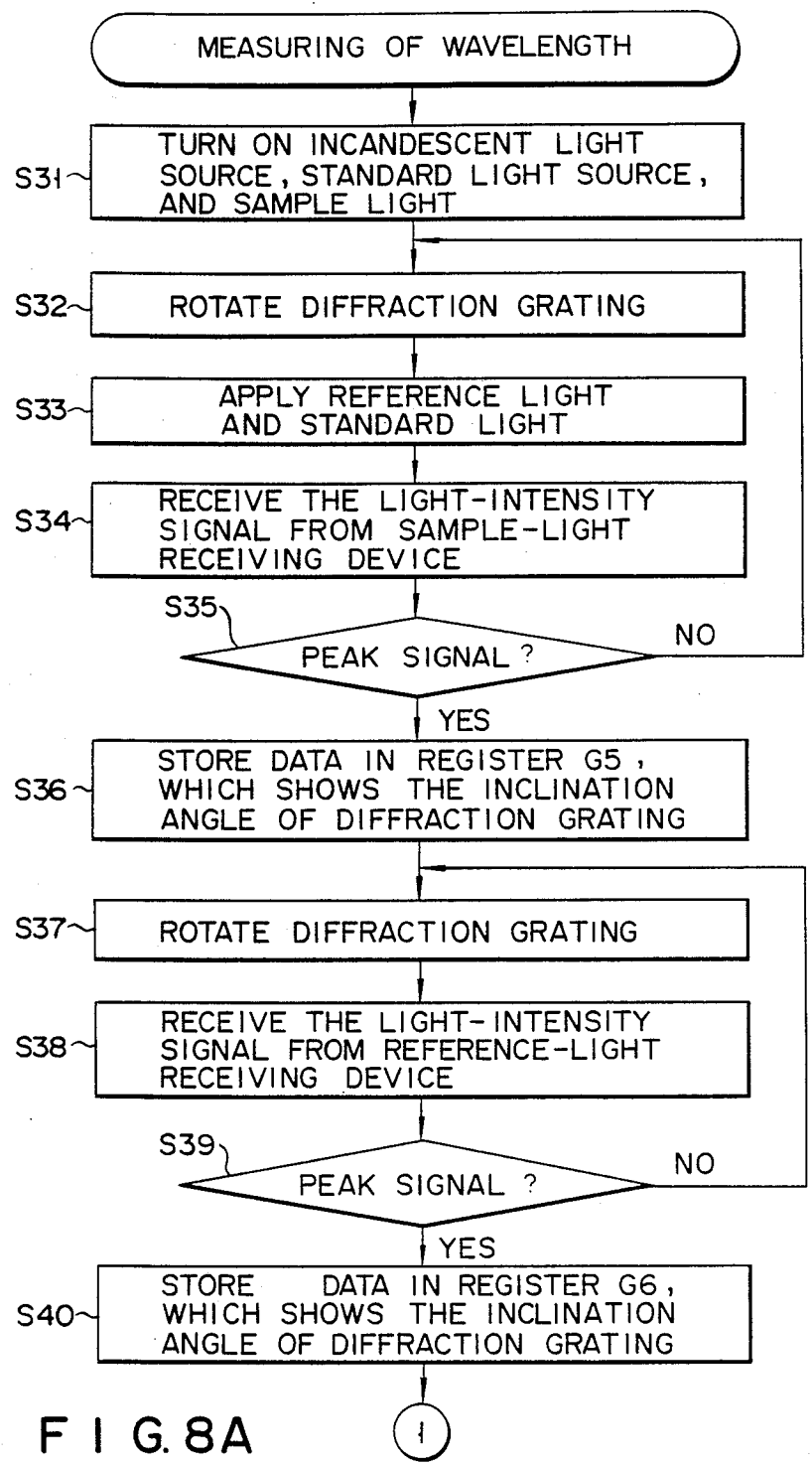
F I G. 8A

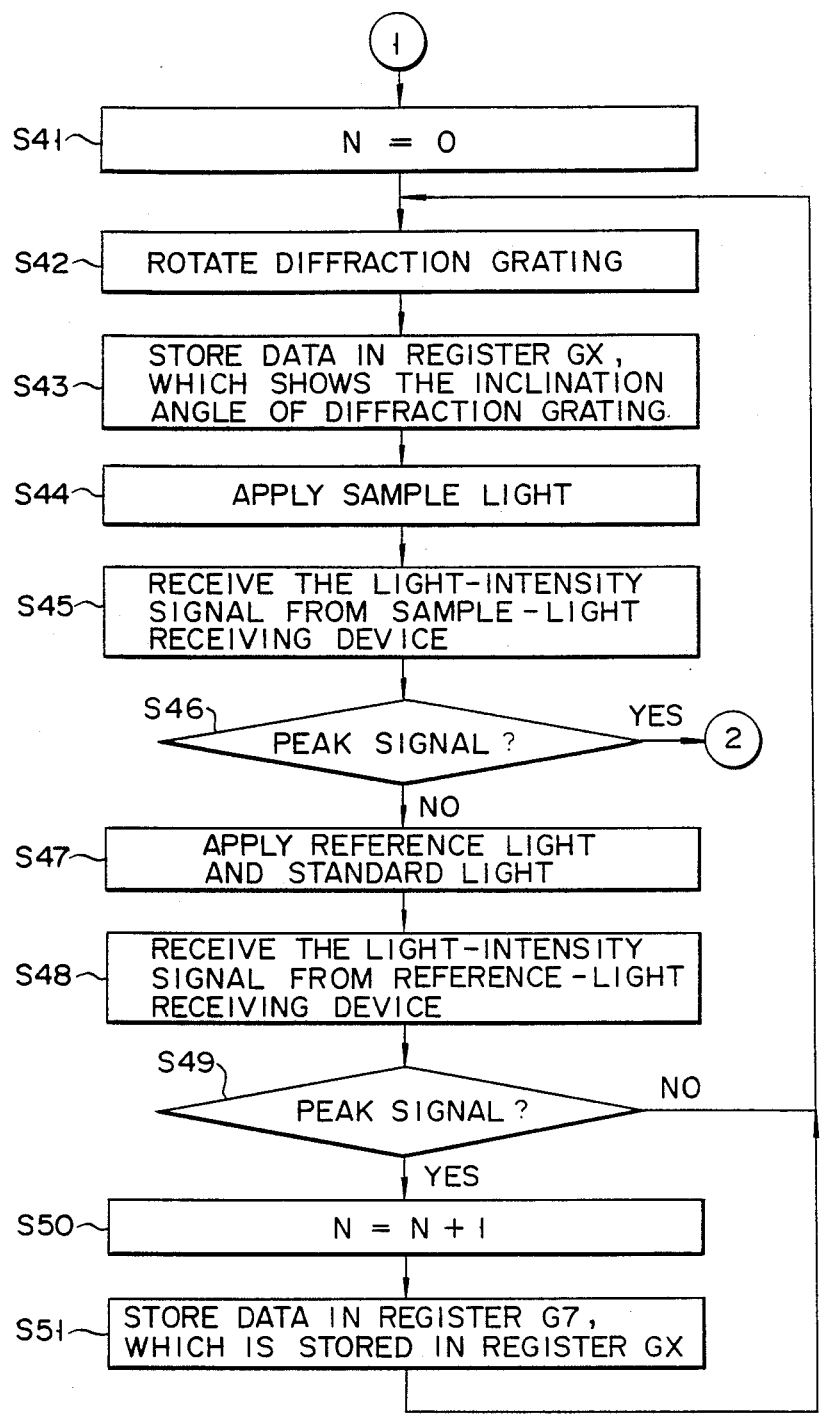
F I G. 8B

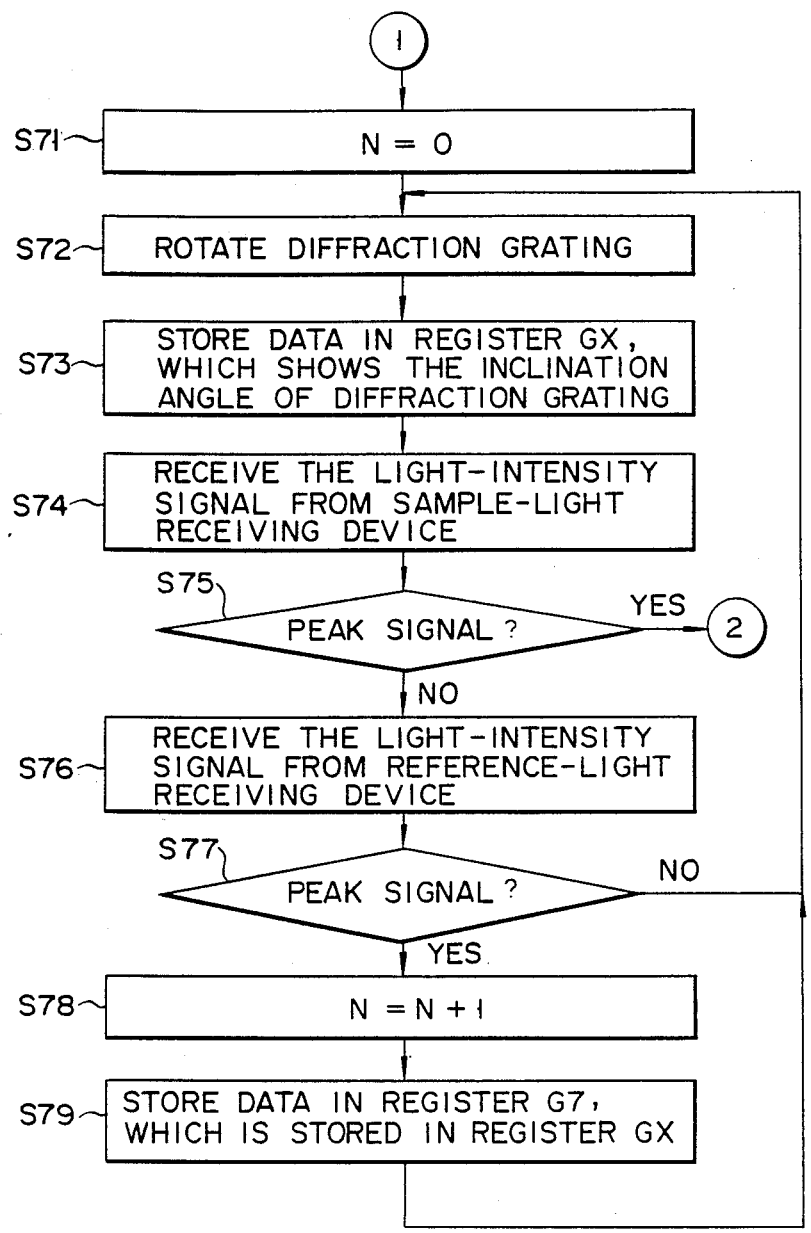
F I G. 10B

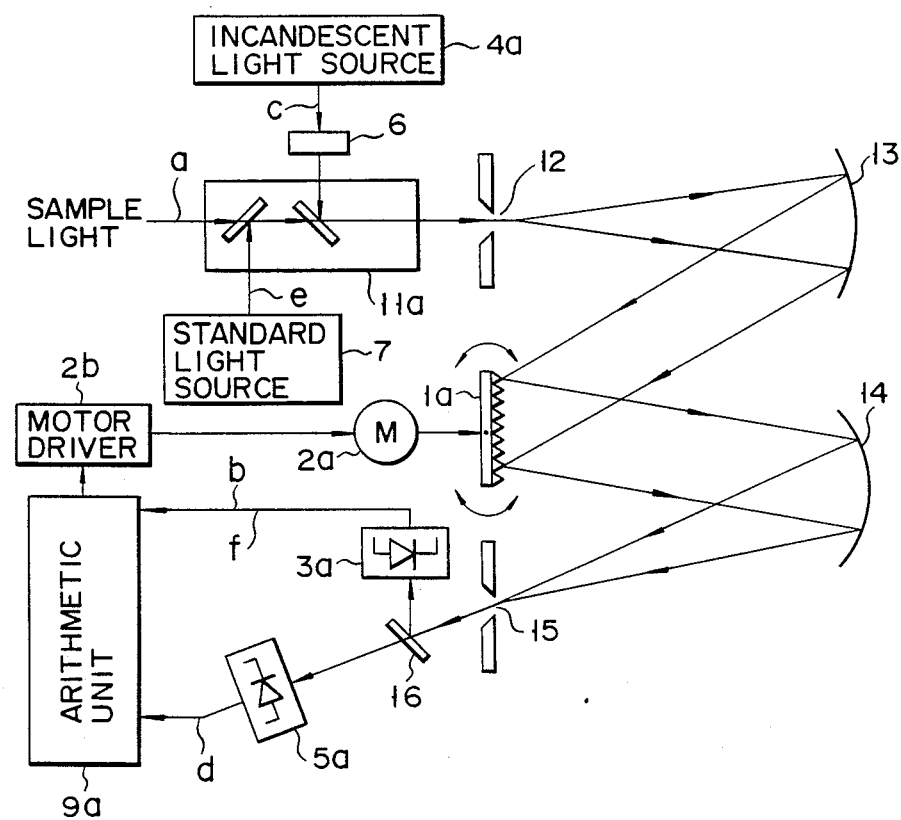
F I G. 12

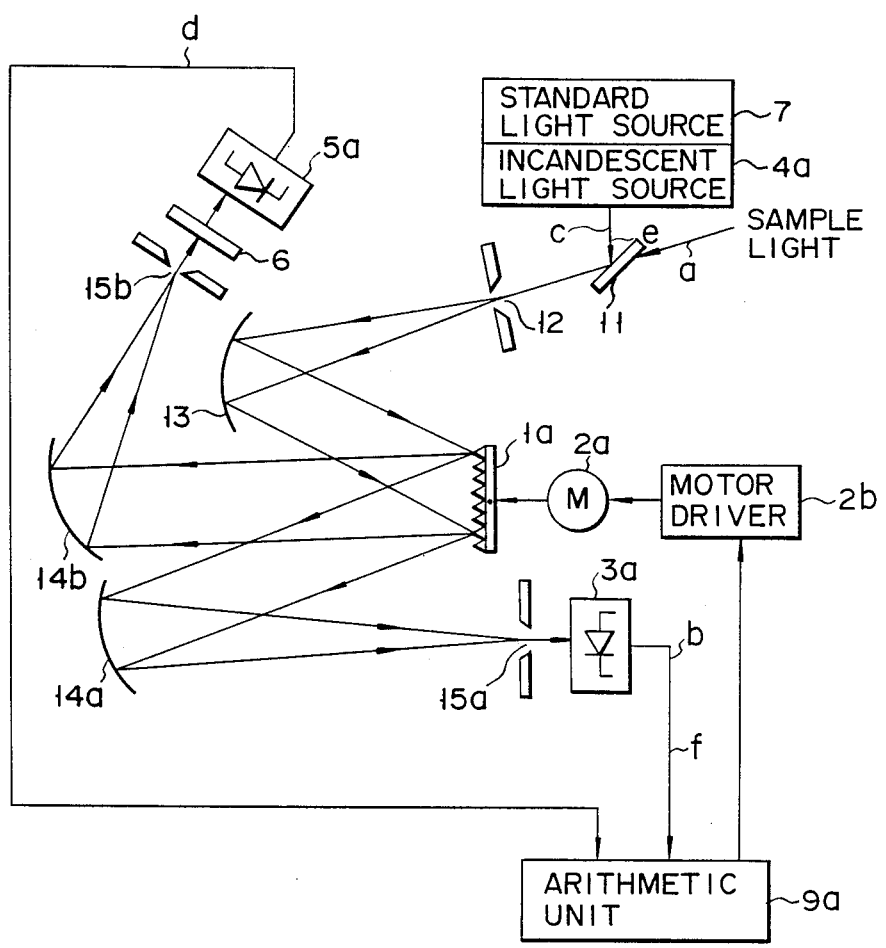
F I G. 13

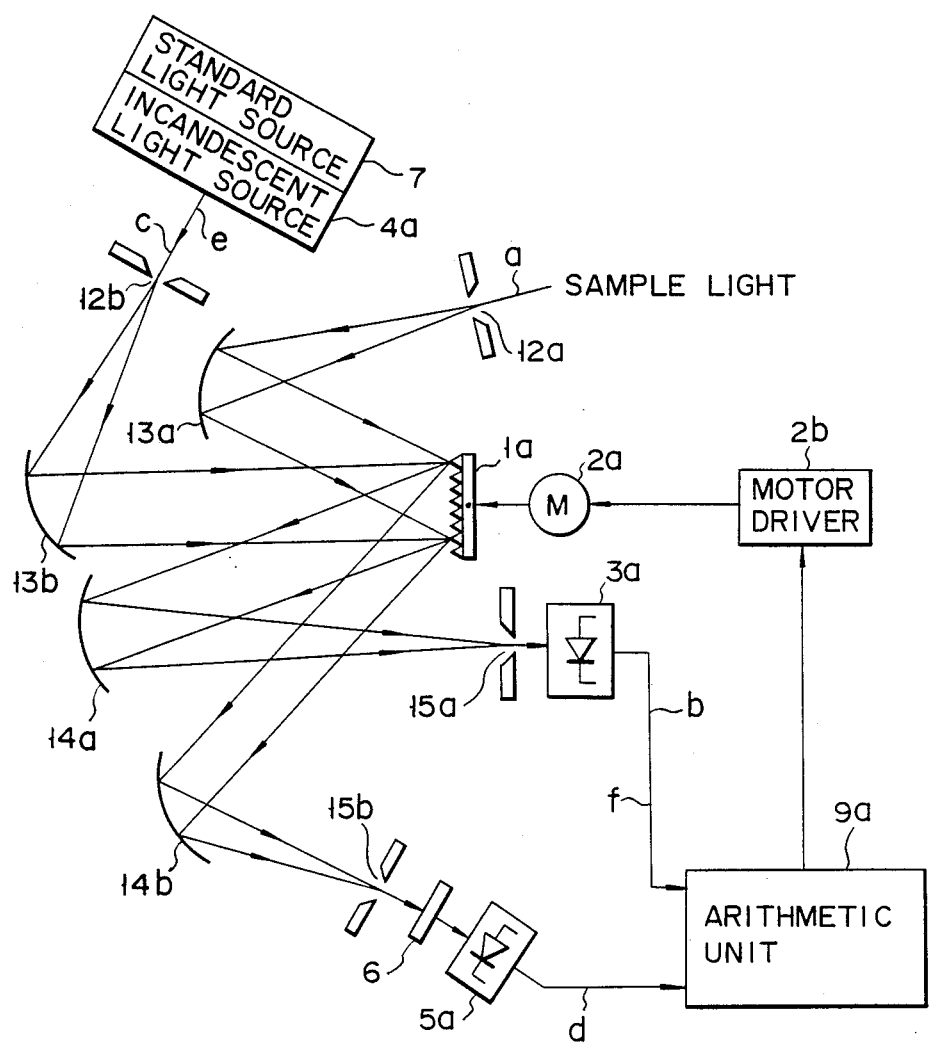
F I G. 14

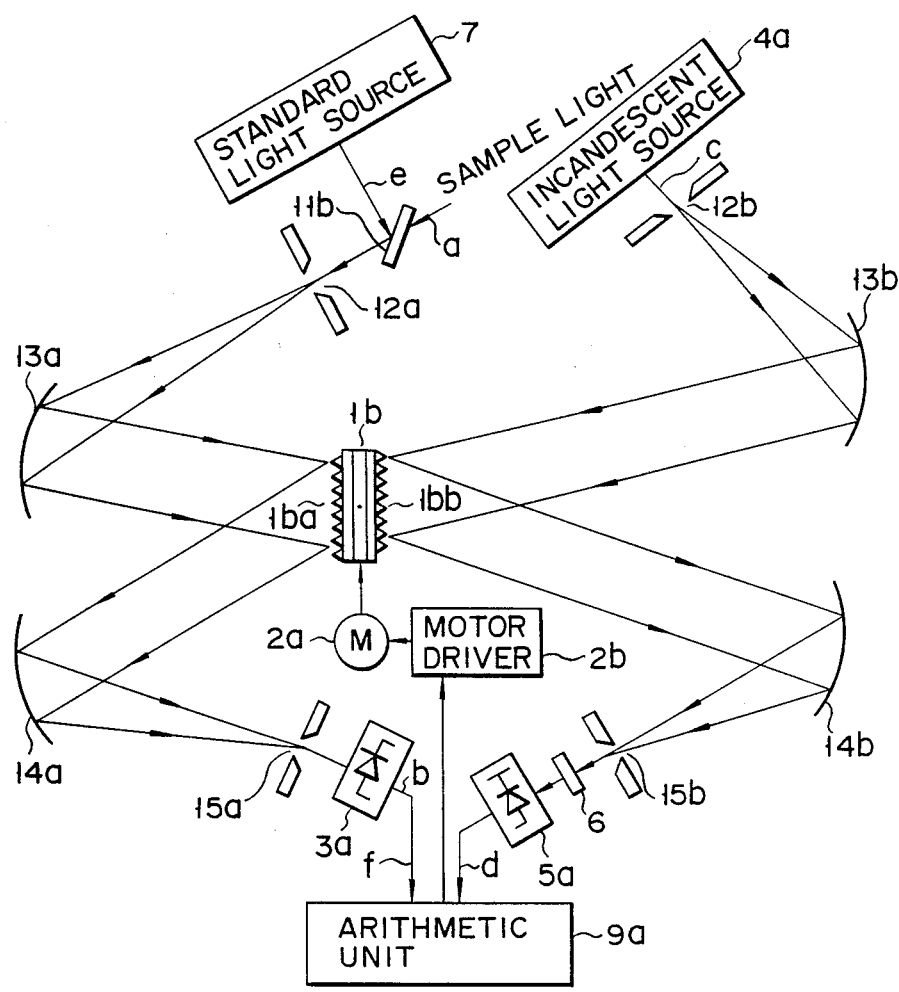
F I G. 15

SPECTROMETER

BACKGROUND OF THE INVENTION

1. Field of the Invention

The present invention relates to a spectrometer having a dispersion-type spectral element such as a prism or a diffraction grating, and more particularly to a spectrometer which can measure the wavelength of sample light accurately even if the mechanism used to rotate the spectral element makes errors.

2. Description of the Related Art

Generally known in the art are spectrometers having a dispersion-type spectral element such as a prism or a diffraction grating. Of these spectrometers, one having a diffraction grating comprises other components including two plates having a slit each, two collimators, a light-receiving device, and a drive mechanism. The slit of the first plate allows the passage of sample light. The sample light passing through the first plate is converted into a parallel light beam by the first collimator. This light beam is reflected by the diffraction grating. The beam is further reflected by the second collimator and applied to the light-receiving device through the slit of the second plate. The received beam has a wavelength λ, which is determined by the angle at which the grating is inclined to the incident beam The light-receiving device outputs an The drive mechanism, which includes a motor, rotates the diffraction grating, inclining the grating at a desired angle to the incident light beam. As the drive mechanism rotates the grating, the angle of inclination of the grating gradually changes, and the wavelength λ of the light beam being received by the light-receiving device changes continuously. Hence, the spectrum of the sample light can be obtained by plotting the light intensities represented by the signals output by the light-receiving device.

The spectrometer described above has a drawback. As can be understood from the above, the wavelength of each light beam may not be identified by the position of the corresponding portion of the spectrum. This is because the angle of inclination of the diffraction grating is not always equal to the angle of rotation of the motor, for two reasons. First, the rotation of the motor cannot be correctly transmitted to the grating because of back-lash caused by the gears connecting the motor and the grating. Second, the motor cannot always rotate through exactly the same angle as is represented by the drive signal input to it.

Thus, the accuracy of the inclination angle of the diffraction grating depends upon the design precision of the drive mechanism and the response characteristic of assembling precision of the components.) Ultimately, the accuracy, with which the spectrometer can measure the wavelength of sample light, depends upon the design precision of the drive mechanism and the response characteristic of the motor. Unless the design precision of the mechanism or the response characteristic of the motor, or both, are improved, the wavelength-measuring accuracy of the spectrometer cannot be increased. The precision, with which the drive mechanism can rotate the diffraction grating, is about 1/30° at best. This value is equivalent to a wavelength-measuring error of as much as 0.1 to 1.0 nm.

SUMMARY OF THE INVENTION

Accordingly, the object of the present invention is to provide a spectrometer which has a dispersion-type spectral element and an etalon for generating a reference signal from reference light consisting of beams of various wavelengths over a broad range, and which can accurately measure the wavelength of sample light by using the reference signal, despite the mechanical errors of the drive mechanism used for driving the spectral element.

According to the present invention, there is provided a spectrometer comprising a dispersion-type spectral element for reflecting incident sample light, a drive mechanism for rotating the spectral element, sample-light receiving means for receiving the sample light reflected by the spectral element and generating a first signal representing the intensity of the sample light, a reference light source for applying reference light consisting of beams having various wavelengths over a broad range, reference-light receiving means for receiving the reference light reflected by the spectral element and generating a second signal representing the intensity of the reference light, an etalon located in an optical path extending from the reference light source to the reference-light receiving means, a standard light source for applying standard light consisting of only one beam having a known wavelength, standard-light receiving means for receiving the standard light reflected by the spectral element and generating a third signal representing the intensity of the standard light, and calculating means for receiving the first, second, and third signals separately, and obtaining from the second and third signals a wavelength scale used for calculating from the first signal the wavelength of the sample light.

BRIEF DESCRIPTION OF THE DRAWINGS

FIG. 3 is a diagram representing the relationship between the transmittance of the etalon and the wavelength of the light output by the etalon;

FIG. 4 is a block diagram showing a spectrometer which is a first embodiment of the present invention;

FIG. 8A through FIG. 8C form a flow chart explaining a method which the spectrometer shown in FIG. 4 can employ to measure the wavelength of sample light;

FIG. 10A through FIG. 10C form a flow chart explaining another method which the spectrometer can employ to measure the wavelength of sample light;

FIG. 12 is a block diagram showing a spectrometer which is a second embodiment of the present invention;

FIG. 13 is a block diagram showing a spectrometer which is a third embodiment of the present invention;

FIG. 14 is a block diagram showing a spectrometer which is a fourth embodiment of the present invention;

FIG. 15 is a block diagram showing a spectrometer which is a fifth embodiment of the present invention.

DETAILED DESCRIPTION OF THE PREFERRED EMBODIMENTS

Figure 1:
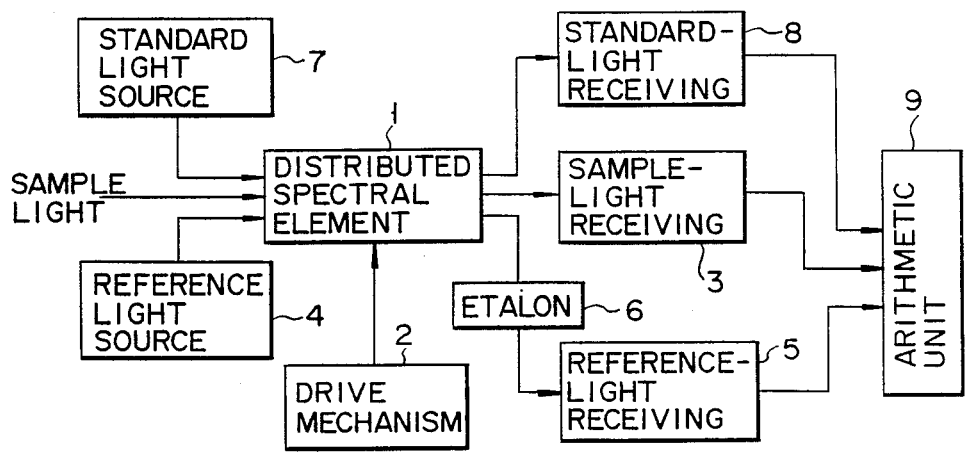
FIG. 1 is a block diagram showing the basic structure of the spectrometer according to the present invention.
Figure 2:
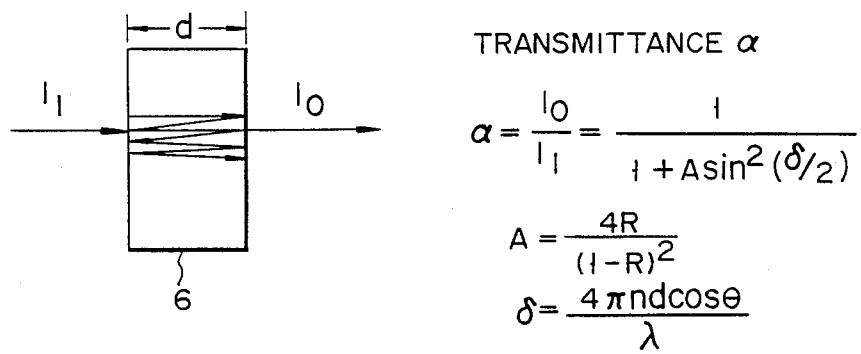
FIG. 2 is a diagram explaining the function of the etalon used in the spectrometer illustrated in FIG. 1.

The principle of the present invention will first be explained, with reference to FIGS. 1, 2, and 3. FIG. 1 is a block diagram showing the basic structure of a spectrometer according to the invention. As this FIGURE illustrates, the spectrometer comprises a dispersion-type spectral element 1, a drive mechanism 2 for driving the element 1, a sample-light receiving device 3, a reference light source 4, a reference-light receiving device 5, an etalon 6, a standard light source 7, a standard-light receiving device 8, and an arithmetic unit 9.

The dispersion-type spectral element 1 produces a spectrum of sample light. The drive mechanism 2 rotates the spectral element 1. The sample-light receiving device 3 receives the sample light from the spectral element 1, and generates a first signal representing the intensity of the sample light. The reference light source 4 applies, to the spectral element 1, reference light consisting of beams of various wavelengths over a broad range. The reference-light receiving device 5 receives the reference light and produces a second signal representing the intensity of the reference light. The etalon 6 is located in the optical path extending from the reference light source 4 to the reference-light receiving device 5. The standard light source 7 applies standard light to the spectral element 1. The standard-light receiving device 8 receives the standard light output by the spectral element 1 and generates a third signal representing the intensity of the standard light. The arithmetic unit 9 receives the first signal, the second signal, and the third signal, one after another, and obtains from the second and third signals a wavelength scale used for calculating from the first signal the wavelength of the sample light.

The etalon 6 will be described in greater detail. It is an element comprising a plate made of glass or quartz crystal, having a thickness of 0.5 to 1.0 mm, and having a completely parallel opposing surfaces, and two metal layers formed on these surfaces, respectively, and each having an inner mirror surface of high reflectance. When light is applied to the first metal layer, virtually perpendicular thereto, it is repeatedly reflected on the inner surfaces of the metal layers and propagates in the glass or crystal plate, back and forth several times between the metal layers. The transmittance $\alpha$ to the incident light is given as follows:

$$\alpha = I_0 I_I = \frac{1}{1 + A \sin^2(\delta/2)}$$

$$A = \frac{4R}{(1-R)^2}$$

$$\delta = \frac{4\pi nd \cos\theta}{\lambda}$$

where R is the reflectance of either metal layer, n is the refractive index of the etalon 6, d is the thickness of the glass or crystal plate, $\theta$ is the angle at which the etalon 6 is inclined to the incident light, and $\lambda$ is the wavelength of the light incident on the etalon 6.

The reflectance R, the refractive index n, and the thickness d are invariables or constants which are specific to the etalon 6. The angle $\theta$ of inclination is also specific to position of the etalon 6 provided in the spectrometer. Hence, the transmittance $\alpha$ varies with the wavelength $\lambda$ of the light incident on the etalon 6, and is a trigonometric function of the wavelength $\lambda$ as is shown in FIG. 3. Therefore, the device 5 generates, from the reference light output by the etalon 6, a sine-wave signal having peaks 6a recurring at wavelength-intervals $\Delta\lambda$ of the following value:

$$\Delta\lambda = \frac{\lambda^2}{2nd \cos\theta} . \quad (1)$$

As can be understood from equation (1), the peaks 6a recurs at wavelength-intervals determined by the physical characteristics of the etalon 6.

As has been pointed out, the reference light supplied from the reference light source 4 consists of beams having various wavelengths over a broad range. Therefore, the second light-intensity signal, which the device 5 produces from the light supplied from the spectral element 1 through the etalon 6, consists of only peak signals 6a produced at wavelength-intervals $\Delta\lambda$, as is shown in FIG. 3.

On the other hand, the third light-intensity signal, which the device 8 generates from the standard light supplied from the standard light source 7 through the spectral element 1, consists of beams, all having a known wavelength. Hence, when the third light-intensity signal is compared with the second light-intensity signal, the wavelengths represented by the peak signals 6a can be determined with high accuracy. In other words, the peak signals 6a can be used as a wavelength scale for determining the wavelength of the sample light from the first light-intensity signal output by the sample-light receiving device 3. More precisely, the wavelength of the sample light can be determined by the position relationship between the first light-intensity signal, on the one hand, and the peak signals 6a of the wavelength scale.

The wavelength-interval $\Delta\lambda$ between any two adjacent peak signals 6a is proportionate to the wavelengths which are represented by these peak signals 6a. That is, the interval $\Delta\lambda$ is a variable. However, since the interval $\Delta\lambda$ can be correctly computed by the arithmetic unit 9, the changes in this wavelength-interval can be compensated for, and thus imposes no adverse influence on the measuring of the wavelength of the sample light.

As can be understood from the above, the angle at which the spectral element 1 is inclined to the light incident on it need not be detected to measure the wavelength of the sample light. Therefore, it is unnecessary to measure the inclination angle of the spectral element 1 or the rotation angle of the motor of the drive mechanism 2. The spectrometer according to the present invention can therefore detect the wavelength of the sample light with high accuracy, even if the drive mechanism 2 has mechanical errors.

Embodiments of the present invention will now be described, one by one, with reference to the accompanying drawings.

FIG. 4 schematically shows a spectrometer according to a first embodiment. Sample light a is applied to a light synthesizer 11 made of, for example, a half mirror. The light output from the light synthesizer 11 is applied via a slit plate 12 to a collimator 13. The collimator changes the sample light a into a parallel beam. This light beam is applied to a diffraction grating 1a which is used as dispersion-type spectral element 1. The diffraction grating 1a reflects the beam, thus supplying the beam to a collimator 14. The sample-light beam, incident upon the collimator 14, has the wavelength λ determined by the angle at which the grating 1a is inclined to the beam applied from the collimator 13. The collimator 14 reflects the sample-light beam, and applies the same through a slit plate 15 to a beam splitter 16 including a half mirror. The beam splitter 16 applies the beam a sample-light receiving device 3a functioning as a sample-light receiving device 3 of FIG. 1.

The sample-light receiving device 3a generates a first light-intensity signal b which represents the intensity of the sample light a having only one component of wavelength λ. The first light-intensity signal b is input to an arithmetic unit 9a.

The diffraction grating 1a is rotated by the electric motor 2a incorporated in a drive mechanism 2. The motor 2a is controlled by a motor driver 2b also incorporated in the drive mechanism 2. The motor driver 2b supplies the motor 2a with a drive signal, thereby driving the motor 2a for a predetermined time, every time it receives one command from the arithmetic unit 9a. Hence, the angle at which the diffraction grating 1a is inclined to the incident light (that is, the angle through which the motor 2a has rotated the grating 1a) can be determined by the number of the commands supplied to the motor driver 2b.

Applied to the light synthesizer 11, besides the sample light a, is the reference light c supplied from an incandescent light source 4a which is used as a reference light source 4. The reference light c consists of beams having various wavelengths over a range broader than the wavelength range within which fall the beams forming the sample light a. The reference light c is applied to the beam splitter 16 in the same optical path as the sample light a, said optical path being constituted by the slit plate 12, the collimator 13, the diffraction grating 1a, the collimator 14, and the slit plate 15. The reference-light beam input to the beam splitter 16 has the wavelength λ. This beam is applied from the beam splitter 16 to an etalon 6. The light beam passing through the etalon 6 is applied to a reference-light receiving device 5a functioning as a reference-light receiving device 5 of FIG. 1. The device 5a converts the reference light c in a second light-intensity signal d representing the intensity of the reference light c. The signal d is input to the arithmetic unit 9a.

Also applied to the light synthesizer 11, simultaneously with the reference light c, is standard light e supplied from a standard light source 7 and consisting of only one beam having a wavelength $\lambda_r$. The standard light e is applied to the beam splitter 16 in the same optical path as the sample light a. The standard light e is applied from the beam splitter 16 to the sample-light receiving device 3a which also functions as a standard-light receiving device 8, of FIG. 1. The device 3a generates a third light-intensity signal f which represents the intensity of the standard light c. The signal f is input to the arithmetic unit 9a.

The light synthesizer 11 combines the sample light a, the reference light c, and the standard light e, thereby obtaining a single light beam. The beam splitter 16 splits this single beam into the sample light a, the reference light c, and the standard light e. The light beam can be synthesized and split by two methods. The first method is to perform time-division on the sample light a, the reference light c, and the standard light e, at a frequency while the diffraction grating 1a is being rotated by the electric motor 2a. The second method is to detect the sample light a, then apply it through the path of the reference light c or the path of the standard light e.

Figure 5:
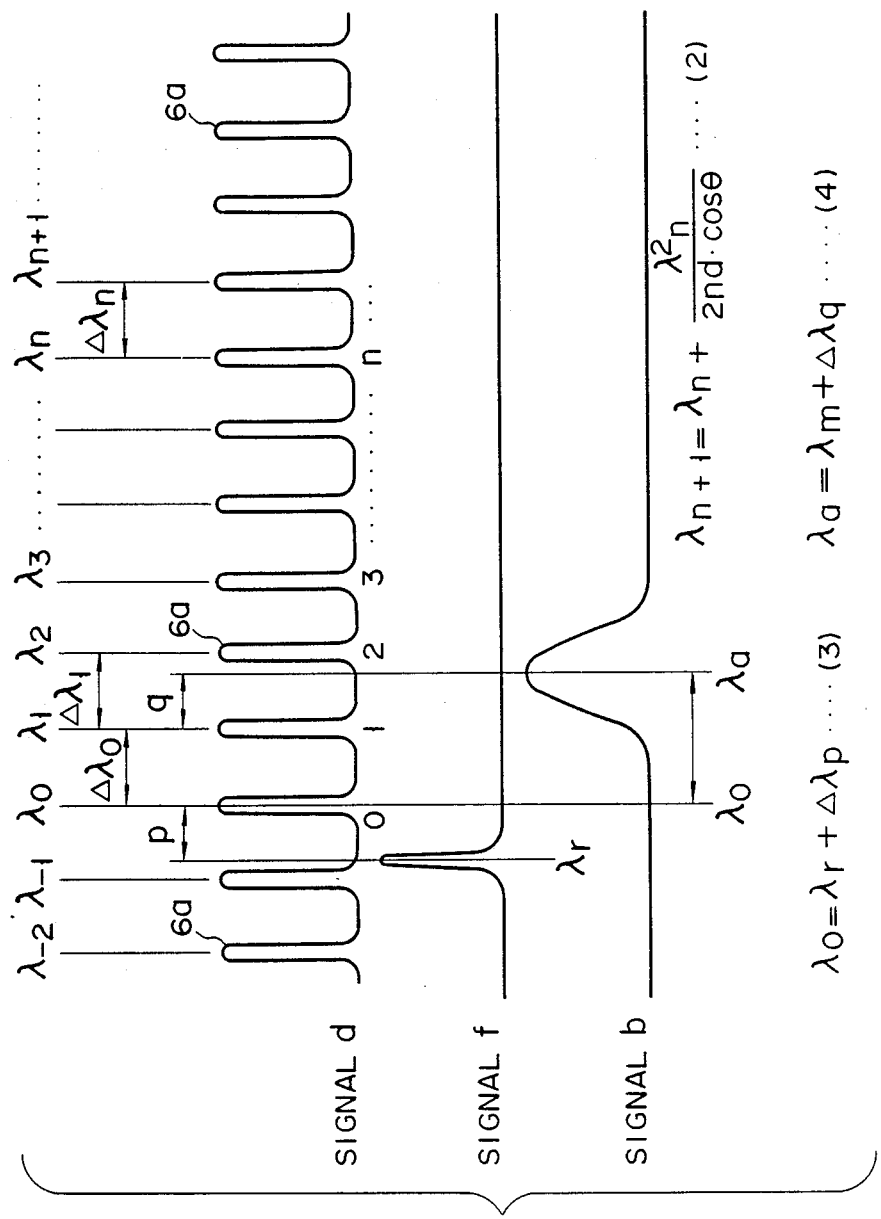
FIG. 5 is a graph showing the relationship of the wavelength and output signals of the light-receiving devices used in the spectrometer shown in FIG. 4.

When the first method is used, the light-intensity signals b, d, and f are substantially continuous, as is shown in FIG. 5. The means for performing the time-division can be choppers set in front of the half mirrors of the light synthesizer 11 and the beam splitter 16, for repeatedly shielding and passing the beams at high frequency. Alternatively, the means can be either mechanisms for reciprocating the half mirrors of the synthesizer 11 and the beam splitter 16 in the directions of arrow A (see FIG. 4), or a device for repeatedly turning on and off the sample light source (not shown), the standard light source 7, and the incandescent light source 4a.

The operation of the spectrometer described above will now be explained.

First, the sample light a, the reference light c, and the standard light e are input to the light synthesizer 11 by the time-division method described above. Meanwhile, the motor 2a is rotated at a constant speed. The diffraction grating 1a is thereby rotated, thus outputting the light a, the light c, and the light e separately. The intensity signal d output by the device 5a and representing the intensity of the reference light c, and the signals b and f output by the device 3a and representing the intensity of the sample light a and that of the standard light e, respectively, are input to the arithmetic unit 9a.

As is evident from FIG. 5, the signal f showing the intensity of the standard light e has one peak at wavelength $\lambda_r$. In contrast, the signal d representing the intensity of the reference light c has many peaks 6a at various wavelengths. Here, that peak 6a at the wavelength similar to, but longer than the wavelength identical with the sole peak of the signal f is called the "first" peak of the signal d. The first peak 6a is identified with wavelength $\lambda_0$. The second peak 6a, the third peak 6a, the fourth peak 6a, and so on are at wavelengths $\lambda_1$, $\lambda_2$, $\lambda_3$, and so on. Hence, any peak 6a other than the first, or the (n+1) the peak (n=1, 2, 3 . . . ) is at wavelength $\lambda_{n+1}$, which can be given:

$$\lambda_{n+1} = \lambda_n + \Delta\lambda_n = \frac{\lambda_n + \lambda_n^2}{2nd\cos\theta} \quad (2)$$

As evident from equation (2), the wavelengths identified with all peaks 6a other than the first peak can be obtained merely by repeating the calculation of equation (2), only if the wavelength $\lambda_0$ identical with the first peak has been accurately detected.

The wavelength $\lambda_0$ is calculated as follows. First, the distance p between the peak of the signal f, which occurs at wavelength $\lambda_r$, and the first peak 6a of the signal d is detected. Then, the wavelength-interval $\Delta\lambda_0$ between the first peak 6a and the second peak 6a of the signal d is measured. The wavelength difference $\Delta\lambda_p$ equivalent to the distance p is obtained from the ratio of the distance p to the distance corresponding to the interval $\Delta\lambda_0$. This difference $\Delta\lambda_p$ is added to the wavelength $\lambda_r$, thereby computing the wavelength $\lambda_0$. Namely:

$$\lambda_0 = \lambda_r + \Delta\lambda_p \qquad (3).$$

As a result, the wavelength $\lambda$ at which any peak 6a appears in the signal d showing the intensity of the reference light c is calculated with high accuracy.

As is shown in FIG. 5, the signal b representing the intensity of the sample light a also has a peak at wavelength $\lambda_a$. This wavelength $\lambda_a$ is computed in the following way. First, the two adjacent peaks 6a of the signal d are detected, between which the signal b has a peak. The distance q between the peak 6a, which has wavelength $\lambda_m$ shorter than the wavelength $\lambda_a$, and the wavelength $\lambda_a$ are detected. (In the case shown in FIG. 5, $\lambda_m = \lambda_1$.) The wavelength difference $\Delta\lambda_q$ is obtained from the ratio of the distance q to the distance corresponding to the wavelength-interval $\Delta\lambda_m$ between the two peaks 6a. This difference $\Delta\lambda_q$ is added to the wavelength $\lambda_m$, thereby computing the wavelength $\lambda_a$. Namely:

$$\lambda_a = \lambda_m + \Delta\lambda_q \qquad (4)$$

The arithmetic unit 9a performs all calculations specified above, thus correctly computing the wavelength $\lambda$ at which the signal b representing the intensity of the sample light a has a peak. In other words, whatever value the wavelength $\lambda$ has, the arithmetic unit 9a can accurately determine this wavelength $\lambda$ from the wavelengths $\lambda_0, \lambda_1, \lambda_2, \ldots$ at which peaks 6a appear in the signal d which represents the intensity of the reference light c output by the etalon 6. The wavelength $\lambda$ need not be obtained from the signal which drives the drive mechanism 2 (including the motor 2a), thereby rotating the diffraction grating 1a. Therefore, the wavelength $\lambda$ can be correctly determined even if the drive mechanism 2 makes errors such as backlash. Obviously, the method of determining the wavelength $\lambda$ of the sample light a, which has been explained above, is superior than the use of a mechanical device for measuring the angle of rotation of the diffraction grating 1a, since the measuring device is likely to make errors.

Owing to the use of the above method of determining the wavelength $\lambda$, the spectrometer can measure the wavelength $\lambda$ with accuracy of above 0.01 to 0.1 nm. In other words, its accuracy is about ten times or more higher than that of the conventional spectrometer.

Figure 6A:
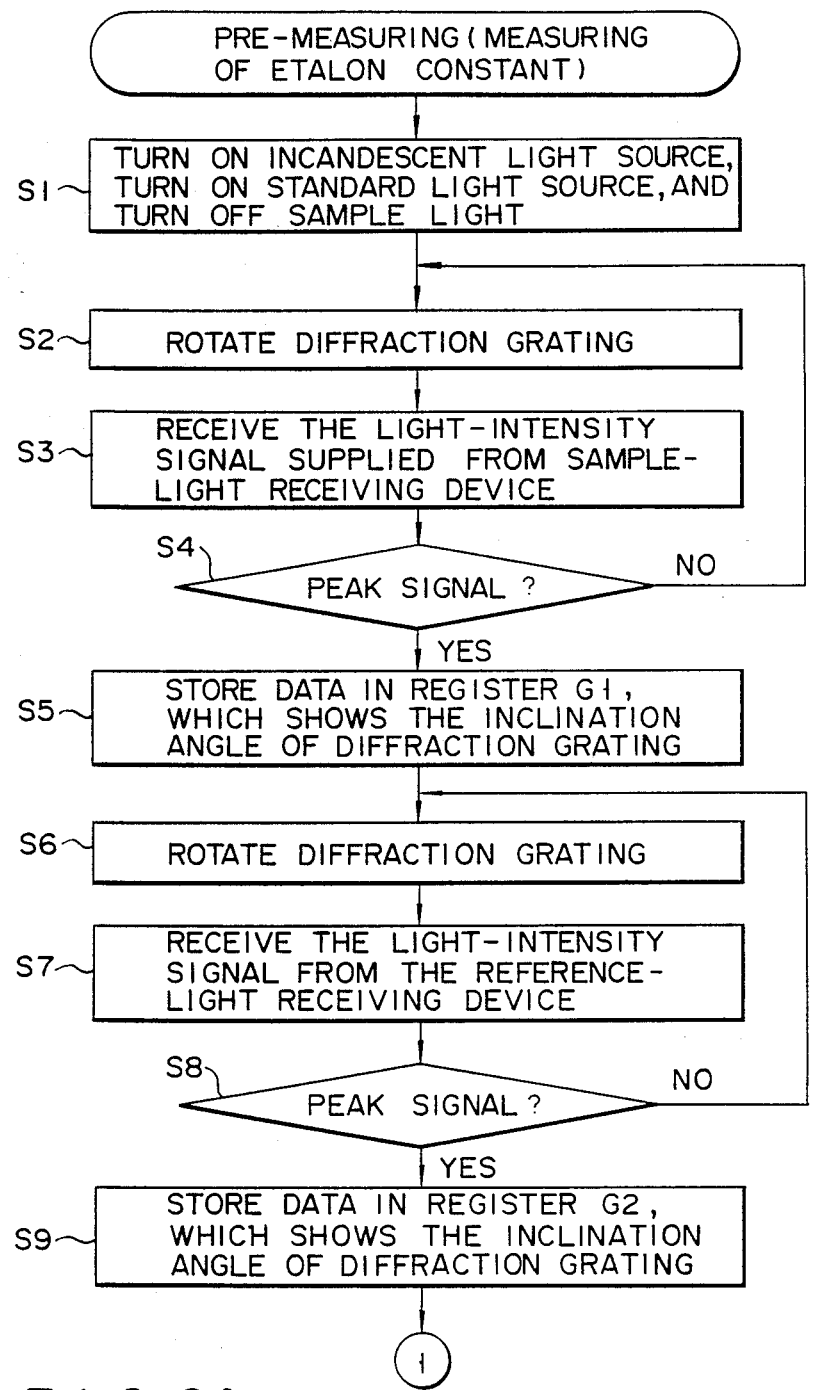
FIG. 6A through FIG. 6C form a flow chart explaining the operation of the spectrometer illustrated in FIG. 4.
Figure 6B:
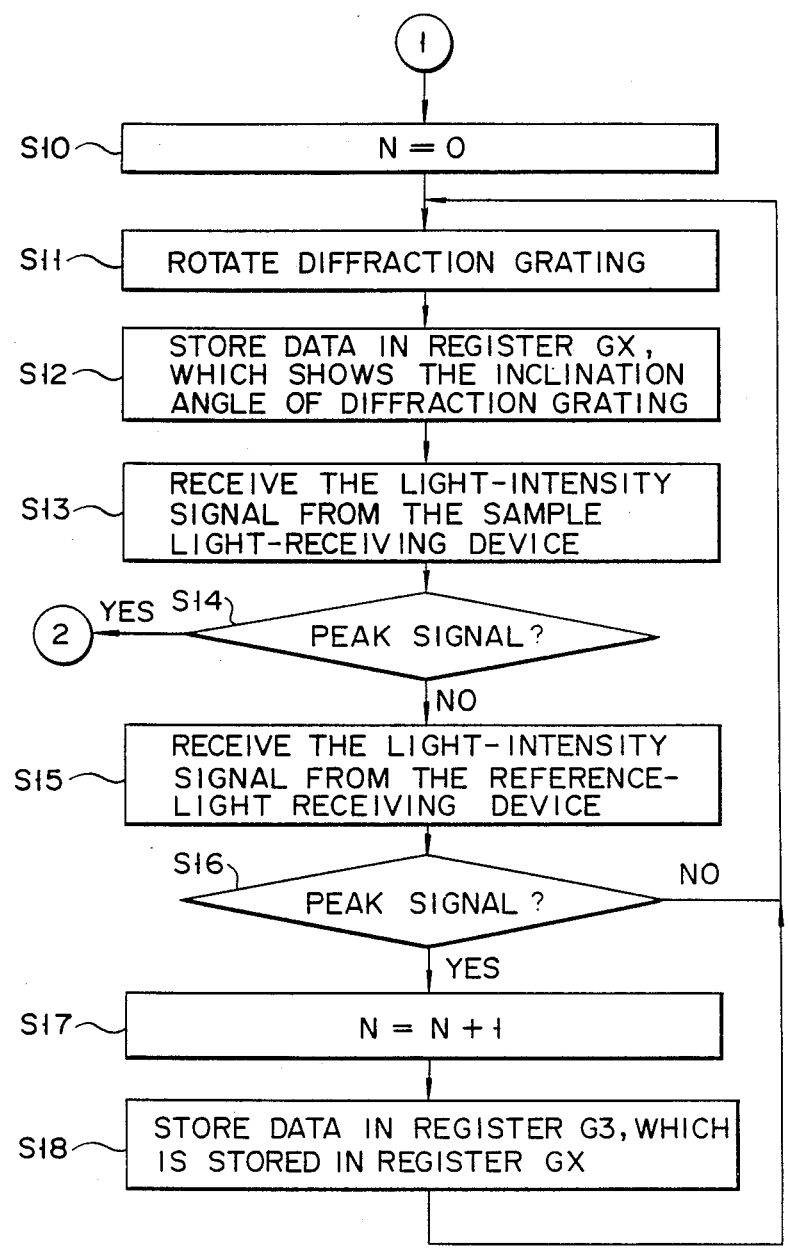
Figure 6C:
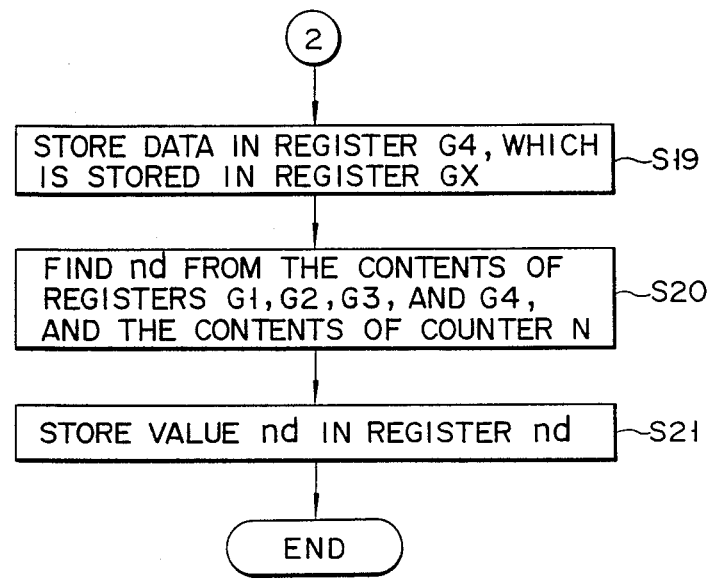

In the spectrometer described above, the arithmetic unit 9a determines the constant of the etalon 6, i.e., the product (nd) of the refractive index n and thickness d. This is because the constant nd, which influences the accuracy of measuring the wavelength $\lambda$, may be different from the design value and does change, though slightly, with the temperature, and should therefore be taken into account in computing the wavelength $\lambda$ with high accuracy. It will now be explained how the unit 9a determines the constant nd, with reference to the flow chart shown in FIG. 6A through FIG. 6C.

Figure 7:
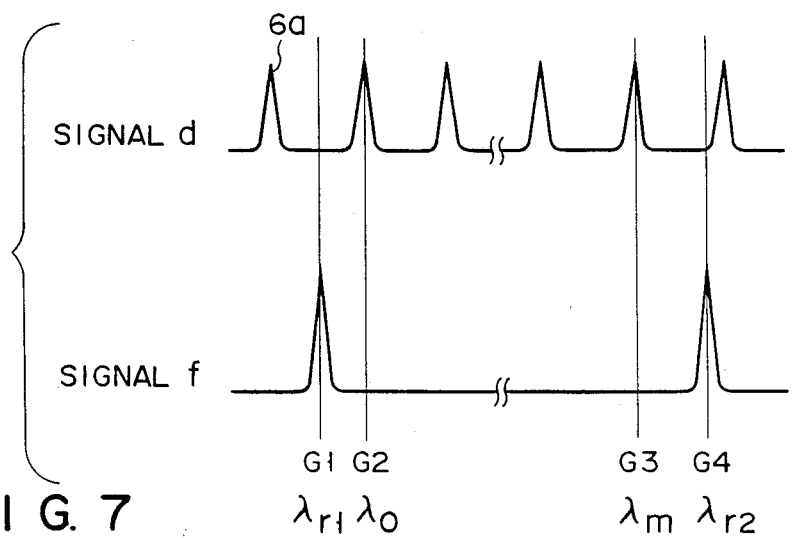
FIG. 7 is a diagram explaining how the etalon finds a constant.

First, in step S1, the incandescent light source 4a and the standard light source 7 are turned on, and the sample light a is shielded from the light synthesizer 11. The standard light source 7 can be either one which components of known different wavelengths. The reference light c and the standard light e are applied to the light synthesizer 11. Both the light c and the light e are applied to the collimator 13 through the slit plate 12. The collimator 13 reflects both light beams and applies them to the diffraction grating 1a. In step S2, the motor 2a rotates the grating 1a through a predetermined angle. Both light beams c and e are reflected by the rotated grating 1a and applied to the collimator 14. The collimator 14 reflects and apply the beams c and e to the beam splitter 16 through the slit plate 15. The standard light e is applied from the beam splitter 16 to the sample-light receiving device 3a, whereas the reference light c is applied first to the etalon and then to the reference-light receiving device 5a. The device 3a converts the light e into a light-intensity signal f. In step S3, the signal f is input to the arithmetic unit 9a. Then, in step S4, the arithmetic unit 9a determines whether or not the signal f has a peak at wavelength $\lambda_{r1}$ as is illustrated in FIG. 7. If NO, the operation returns to step S2, whereby the motor 2a further rotates the diffraction grating 1a by the predetermined angle.

If YES in step S4, the angle of inclination (or the angle of rotation) of the diffraction grating 1a is stored in a register G1 (not shown) in step S5. Then, in step S6, the grating 1a is rotated by the predetermined angle. In step S7, the light-intensity signal d which device 5a generates from the reference light c is input to the arithmetic unit 9a. In step S8, the unit 9a determines whether or not the signal d has a peak at wavelength $\lambda_0$. If NO, the operation returns to step S6, in which the diffraction grating 1a is further rotated by the predetermined angle.

If YES in step S8, the angle of inclination of the diffraction grating 1a is stored in a register G2 (not shown). This angle of rotation is associated with the wavelength $\lambda_0$ at which the next peak 6a appears in the light-intensity signal d. Thereafter, in step S10, a counter N (not shown) is cleared. Then, the diffraction grating 1a is rotated by the predetermined angle in step S11. In step S12, the angle at which the grating 1a is inclined at this time is stored in a register Gx (not shown, either). In step S13, the light-intensity signal f, which the device 3a generates from the standard light e, is input to the arithmetic unit 9a. In step S14, the unit 9a determines whether or not the signal f has a peak at wavelength $\lambda_{r2}$ as is illustrated in FIG. 7. If NO, the signal d output by the device 5a and representing the intensity of the reference light c is input to the arithmetic unit 9a in step S15. In the next step, S16, the arithmetic unit 9a determines whether or not the signal d has a peak 6a. If NO in step S16, the operation returns to step S11, whereby the diffraction grating 1a is rotated further through the predetermined angle.

If YES in step S16, the count value of the counter N is increased by one, in step S17. In step S18, the data stored in the register Gx and representing the angle of inclination of the grating 1a is stored in a register G3 (not shown). Then, the operation returns to step S11, in which the diffraction grating 1a is rotated again through the predetermined angle. The counter N therefore counts the peaks 6a appearing in the signal d after the peak appears at wavelength $\lambda_{r1}$ in the signal f representing the intensity of the standard light e. That angle of inclination of the grating 1a which is associated with the last peak 6a that has been detected is stored in the register G3.

If YES in step S14, that is, if the light-intensity signal f has a peak, the angle of inclination, stored in the register Gx, is stored in a register G4 (not shown), in step S19. This angle will be used as one associated with the peak appearing at wavelength $\lambda_{r2}$ in the signal representing the intensity of the standard light e. In step S20, the arithmetic unit 9a computes the constant nd of the etalon 6 (i.e., the product of the refractive index n and the thickness d) from the count value of the counter N and the values stored in the registers G1, G2, G3, and G4. Namely:

$$nd = \frac{N}{2}\left(\frac{1}{\lambda_0} - \frac{1}{\lambda_n}\right) \quad (5)$$

where:

$$\lambda_0 = \lambda_{r1} + (G2 - G1)\frac{d\lambda}{dG_{\lambda=\lambda_{r1}}}$$

$$\lambda_n = \lambda_{r2} + (G4 - G3)\frac{d\lambda}{dG_{\lambda=\lambda_{r2}}}.$$

In step S21, the data showing the constant nd is stored in a register nd (not shown). Thus, the measuring of the constant of the etalon 6 is completed.

Figure 8C:
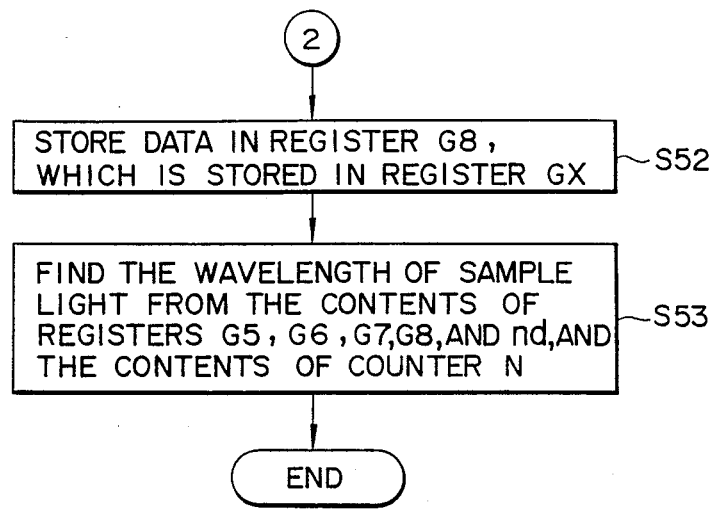
Figure 9:
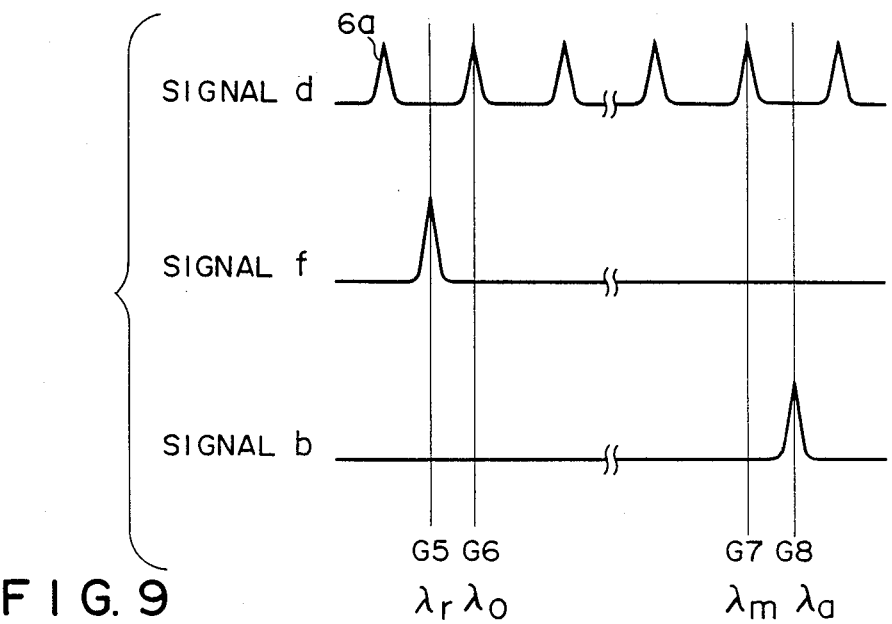
FIG. 9 is a diagram explaining the method defined by the flow chart of FIGS. 8A to 8C.

It will now be explained how the spectrometer shown in FIG. 4 measures the wavelength of the sample light a, with reference to the flow chart of FIG. 8A through FIG. 8C and also with the diagram of FIG. 9.

First, in step S31, the incandescent light source 4a and the standard light source 7 are turned on, and the sample light a is applied to the light synthesizer 11. In step S32, the diffraction grating 1a is rotated by the predetermined angle. Further, in step S33, the half mirror of the synthesizer 11 and the half mirror of the beam splitter 16 are moved such that the reference light c and the standard light e are applied to the light receiving devices 5a and 3a, respectively. In step S34, the signal f output by the device 3a and representing the intensity of the standard light e is input to the arithmetic unit 9a. In step S35, the unit 9a determines whether or not the signal f has a peak at wavelength $\lambda_r$ as is illustrated in FIG. 9. If NO, the operation returns to step S32, and the grating 1a is rotated again through the predetermined angle.

If YES in step S35, the angle of inclination of the grating 1a is stored in a register G5 (not shown) in step S36. Then, in step S37, the grating 1a is further rotated further through the predetermined angle. In step S38, the signal d output by the device 5a and showing the intensity of the standard light c is input to the arithmetic unit 9a. In the next step, S39, the unit 9a determines whether or not the signal d has a peak 6a. If NO, the operation returns to step S37, in which the diffraction grating 1a is further rotated through the predetermined angle. If YES, the operation goes to the next step, S40, in which the angle of inclination of the grating 1a is stored in a register G6 (not shown) in step S40. This angle of inclination is associated with the wavelength $\lambda_0$ at which the next peak 6a appears in the light-intensity signal d.

Thereafter, in step S41, a counter N (not shown) is cleared. Then, the diffraction grating 1a is rotated by the predetermined angle in step S11. In step S42, the angle at which the grating 1a is inclined at this time is stored in a register Gx (not shown, either). In the next step S44, the half mirror of the light synthesizer 11 and that of the beam splitter 16 are moved such that the sample light a is applied to the sample-light receiving device 3a. In step S45, the signal b output by the device 3a and representing the intensity of the sample light a is input to the arithmetic unit 9a. In step S46, the arithmetic unit 9a determines whether or not the signal b has a peak.

If NO in step S46, the half mirrors of the synthesizer 11 and the beam splitter 16 are moved in step S47, thereby applying the reference light c and the standard light e to the light-receiving devices 5a and 3a, respectively. In the next step, S48, the signal d output by the device 5a and showing the intensity of the reference light c is input to the arithmetic unit 9a. In step S49, the unit 9a determines whether or not the signal d has a peak 6a. If NO, the operation returns to step S42, in which the diffraction grating 1a is rotated again through the predetermined angle. If YES, the count value of the counter N is incremented by one, in step S50. In step S51, the angle of inclination of the grating 1a, which is set in the register Gx, is stored into a register G7 (not shown). Then, the operation returns to step S42, in which the diffraction grating 1a is further rotated by the predetermined angle. The number of peaks 6a are thereby counted by the counter N, and the angle of inclination of the grating 1a, which is associated with the peak 6a last detected at wavelength $\lambda_m$, is stored in the register G7.

If YES in step S46 that is if the signal b has a angle is used as one associated with the wavelength $\lambda_a$ of the sample light a. In step S53, the wavelength $\lambda_a$ of the sample light a is calculated from the values stored in the registers G5, G6, G7, and G8, the count value of the counter N, and the constant nd stored in the register nd, in accordance with the following equation:

$$\lambda_a = \lambda_m + (G8 - G7)\frac{d\lambda}{dG_{\lambda=\lambda_m}}$$

where:

$$\lambda_m = 1/\left(\frac{1}{\lambda_0} + \frac{N}{2nd}\right)$$

$$\lambda_0 = \lambda_r - (G6 - G5)\frac{d\lambda}{dG_{\lambda=\lambda_r}}.$$

Figure 10A:
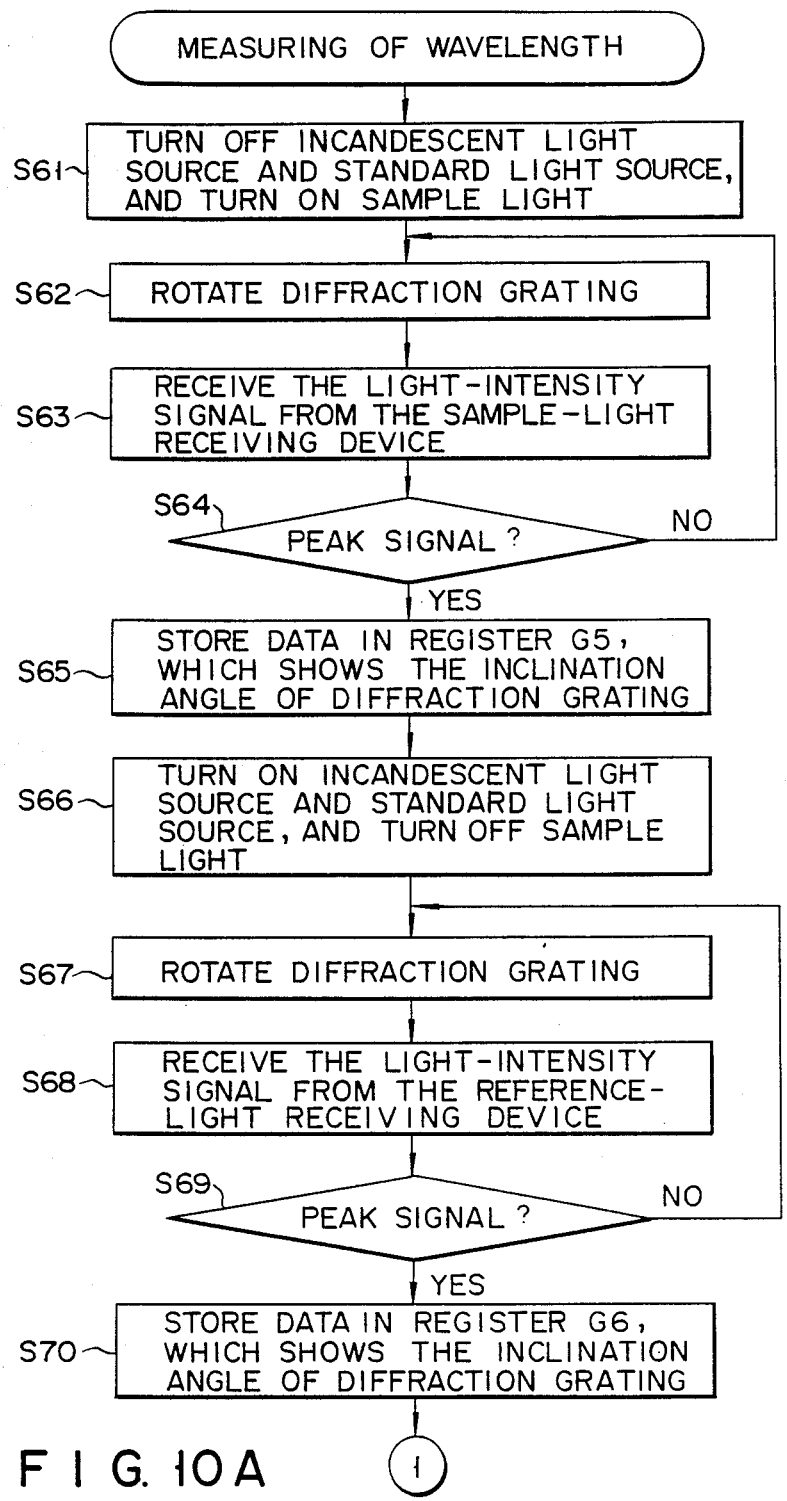
Figure 10C:
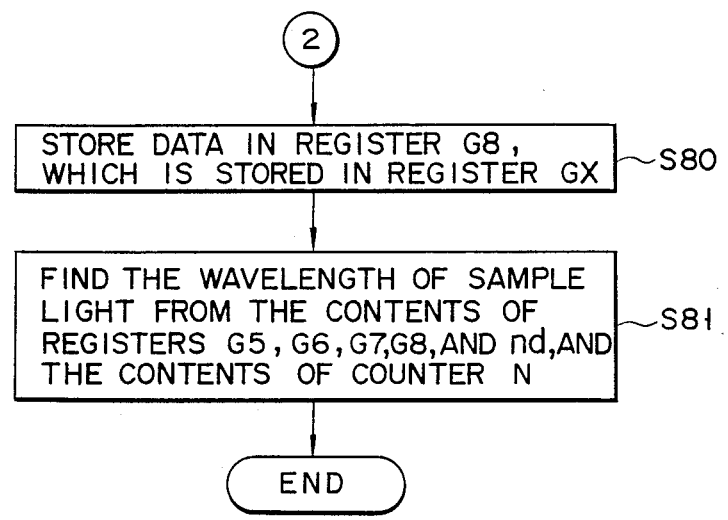
Figure 11:
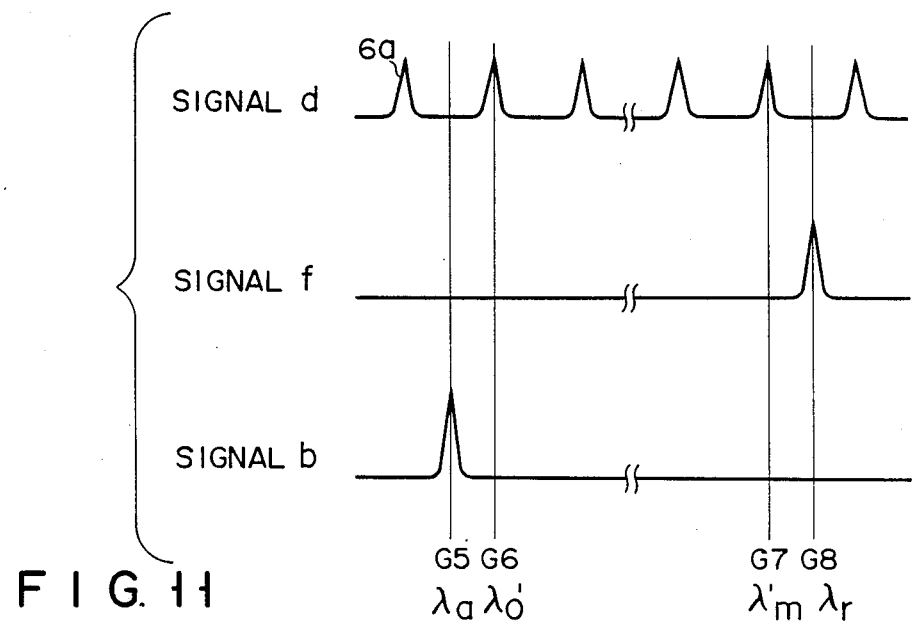
FIG. 11 is a diagram explaining the method defined by the flow chart of FIGS. 10A to 10C.

As can be understood from the above, the wavelength of the ample light a is computed while the sample light a is being detected for a peak. Instead, the spectrometer shown in FIG. 4 can computes the wavelength of the sample light a after detecting a peak in the signal b. This method of computing the wavelength of the sample light a will be explained with reference to the flow chart of FIGS. 10A to 10C and the diagram of FIG. 11.

First, in step S61, the incandescent light source 4a and the standard light source 7 are turned off, and the sample light a is applied to the spectrometer. Then, in step S62, the diffraction grating 1a is rotated and representing the intensity of the sample light a is input to the arithmetic unit 9a. In step S64, the unit 9 determines whether or not this signal b has a peak. If NO, the operation returns to step S62, in which the grating 1a is rotated again through the predetermined angle.

If YES is step S64, the angle of inclination of the grating 1a is stored in the register G5, in step S65. In step S66, the incandescent light source 4a and the standard light source 7 are turned on. In the next step S66, the diffraction grating 1a is rotated through the predetermined angle. In step S68, the signal d output by the reference-light receiving device 5a and representing the intensity of the reference light c is input to the arithmetic unit 9a. The unit 9a determines in step S69 whether or not the signal d has a peak 6a. If NO, the operation returns to step S67, in which the grating 1a is further rotated through the predetermined angle.

If YES in step S69, the operation goes to the next step S70, in which the angle of inclination of the grating 1a is stored in the register G6. This angle of inclination is associated with the peak 6a which appears at wavelength $\lambda_0'$ in the signal d after the peak has appeared in the signal b.

Then, in step S71, the counter N is cleared. In step S72, the diffraction grating 1a is rotated again through the predetermined angle. In step S73, the angle of inclination of the grating 1a is stored into the register Gx. In step S74, the signal f output by the sample-light receiving device 3a and representing the intensity of the standard light e is input to the arithmetic unit 9a. Thus, in step S75, the unit 9a determines whether or not the signal f has a peak.

If NO in step S75, the signal d output by the device 5a and representing the intensity of the reference light c is input to the arithmetic unit 9a in step S76. In the next step S77, the unit 9a determines whether or not the signal d has a peak 6a. If NO, the operation returns to stop S72, in which the grating 1a is rotated again through the predetermined angle. If YES, the operation goes to the next step, S78, in which the count value of the counter N is increased by one. Then, in step S79, the angle of inclination of the grating 1a is stored in the register G7. The operation returns to step S72, in which the diffraction grating 1a is rotated again by the predetermined angle. Steps S72 to S79 are repeated, whereby the counter N counts the number of peaks 6a appearing in the signal d after the peak has appeared in the signal b at wavelength $\lambda_a$, and the angle of inclination, which is associated with the last peak 6a at wavelength $\lambda_m'$, is stored in the register G7.

If YES in step S75, that is, if the signal f has a peak, the angle of inclination set in the register Gx is stored into the register G8 in step S80. This angle is used as one associated with the wavelength $\lambda_r$ of the standard light e. In step S81, the wavelength $\lambda_a$ of the sample light a is calculated from the values stored in the registers G5, G6, G7, and G8, the count value of the counter N, and the constant nd stored in the register nd, in accordance with the following equation:

$$\lambda_a = \lambda_{0'} + (G6 - G5) \frac{d\lambda}{dG_{\lambda=\lambda_{0'}}}$$

where:

$$\lambda_{0'} = 1 / \left( \frac{1}{\lambda_{m'}} + \frac{N}{2nd} \right)$$

$$\lambda_{m'} = \lambda_r - (G8 - G7) \frac{d\lambda}{dG_{\lambda=\lambda_r}}.$$

In the embodiment shown in FIG. 4, the standard light e is used in order to compute the absolute values of the wavelengths at which peaks appears in the signal b and define the spectral characteristics of the sample light a. The standard light e need not be applied if it suffices to determine only the positional relation of these peaks of the signal b.

FIG. 12 schematically shows a spectrometer which is a second embodiment of the invention. The same components as those shown in FIG. 4 are designated at the same numerals in FIG. 12, and will not be described in detail.

The spectrometer shown in FIG. 12 is different in three respects. First, the light synthesizer 11a has two half mirrors or two filters and can, therefore, apply the sample light a, the reference light c, and the standard light e independently to the collimator 13 through the slit plate 12. Second, an etalon 6 is interposed between the incandescent light source 4a and the light synthesizer 11a, so that the reference light c emitted by the source 4a is applied to the synthesizer 11a through this etalon 6. Third, no etalons are interposed between the beam splitter 16 and the reference-light receiving device 5a.

In operation, the incandescent light source 4a applies the reference light c to the etalon 6. The light c consists of beams of various wavelengths over a broad range within which falls the wavelength of the sample light a. The etalon 6 has the transmittance ($\alpha$)-wavelength ($\lambda$) characteristic shown in FIG. 3. Hence, the etalon 6 filters out the components other than peaks 6a. The reference light c applied from the etalon 6 to the light synthesizer 11a has a wavelength characteristic almost identical to that of the signal d shown in FIG. 5. It follows that the signal d which the reference-light receiving device 5a generates from the light c reflected by the diffraction grating 1a is substantially identical to the light-intensity signal d shown in FIG. 5. Further, the signal f which the sample-light receiving device 3a generates from the light e emitted from the standard light source 7 and having wavelength $\lambda_r$ is substantially identical to the signal f shown in FIG. 5. The arithmetic unit 9a processes these signals d and f in the way described above, thus computing the wavelength at which any peak appears i the signal b representing the intensity of the sample light a. Therefore, the spectrometer shown in FIG. 12 can achieve the same advantage as the first embodiment illustrated in FIG. 4.

FIG. 13 schematically shows a spectrometer which is a third embodiment of the invention. The same components as those shown in FIG. 4 are designated at the same numerals in FIG. 13, and will not be described in detail.

This spectrometer is different from the one shown in FIG. 4 in three respects. First, no beam splitters are used. Second, the collimator 14 is replaced by two collimators 14a and 14b. Third, the slit plate 15 is replaced by two slit plates 15a and 15b. The collimator 14a reflects the sample light a and the standard light e, and the collimator 14b reflects the reference light c. (The light beams a, c, and e have been reflected by the diffraction grating 1a.) The sample light a and the standard light e are applied from the collimator 14a etalon 6 to the reference-light receiving device 5a.

In the third embodiment (FIG. 13), the half mirror or a filter is located in the light synthesizer 11, which has such a physical constant that the ratio in wavelength between the sample light a and the reference light c is set at 1:2 or 1:3. Because of the use of this filter, the sample light a and the reference light c can be applied from the same diffraction grating 1a to the collimators 14a and 14b located in different optical paths. The sample-light receiving device 3a can generate two light-intensity signals b and f identical to those shown in FIG. 5, and the reference-light receiving device 5a can generates a light-intensity signal d identical to the one shown in FIG. 5. Therefore, the spectrometer of the structure illustrated in FIG. 13 can accomplish substantially the same advantage as the spectrometer shown in FIG. 4.

FIG. 14 schematically shows a spectrometer which is a fourth embodiment of the present invention. The same components as those shown in FIG. 13 are designated at the same numerals in FIG. 14, and will no be described in detail.

This spectrometer is different from the spectrometer shown in FIG. 13 in that no light synthesizers are used, and the sample light a is applied to the diffraction grating 1a in one optical path, whereas the reference light c and the standard light e are applied to the grating 1a in another optical path. More precisely, the sample light a is applied to the grating 1a through a slit plate 12a and a collimator 13a, and both the reference light c and the standard light e are applied to the grating 1a through a slit plate 12b and a collimator 13b. The sample light a and the standard light e, both reflected by the grating 1a, are applied via the collimator 14a and the slit plate 15a to the sample-light receiving device 3a. On the other hand, the reference light c, also reflected by the grating 1a, is applied through the collimator 14b, the slit plate 15b, and the etalon 6 to the reference-light receiving device 5a. The device 3a converts the light a and the light e into light-intensity signals b and f, respectively, which are identical to those shown in FIG. 5. The device 5a converts the light e into a light-intensity signal d which is identical to the one shown in FIG. 5. The spectrometer can therefore attain almost the same advantage as the spectrometer illustrated in FIG. 13.

FIG. 15 is a schematic diagram showing a spectrometer according to a fifth embodiment of the invention. This spectrometer has an interlocked diffraction grating 1b as dispersion-type spectral element 1. The grating 1b comprises two diffraction gratings 1ba and 1bb bonded together, back to back. The gratings 1ba and 1bb have the same optical characteristic. The interlocked diffraction grating 1b is rotated by the electric motor 2a incorporated in a drive mechanism 2. In operation, sample light a is applied through a light synthesizer 11b and the slit plate 12a. It is then reflected by the collimator 13a and applied to the diffraction grating 1ba. The standard light e emitted from a standard light source 7 is also applied to the grating 1ba in the same optical path as the sample light a. The reference light c emitted from the incandescent light source 4a is applied through the slit plate 12b and reflected by the collimator 13b. The light c is then applied to the diffraction grating 1bb. The sample light a and the standard light e, both reflected from the diffraction grating 1ba, are further reflected by the collimator 14a and applied via the slit plate 15a to the sample-light receiving device 3a. The device 3a converts the light a and light e to light-intensity signals b and f which are identical to those shown in FIG. 5. On the other hand, the reference light c reflected from the diffraction grating 1bb is again reflected by the collimator 14b and applied via the slit plate 15b to the reference-light receiving device 5a through the etalon. The device 5a converts the reference light c to a light-intensity signal d which is identical to that shown in FIG. 5. interlocked diffraction grating 1a have mechanical errors. Hence, the spectrometer shown in FIG. 15 can attain substantially the same advantage as any embodiment described above.

Figure 16:
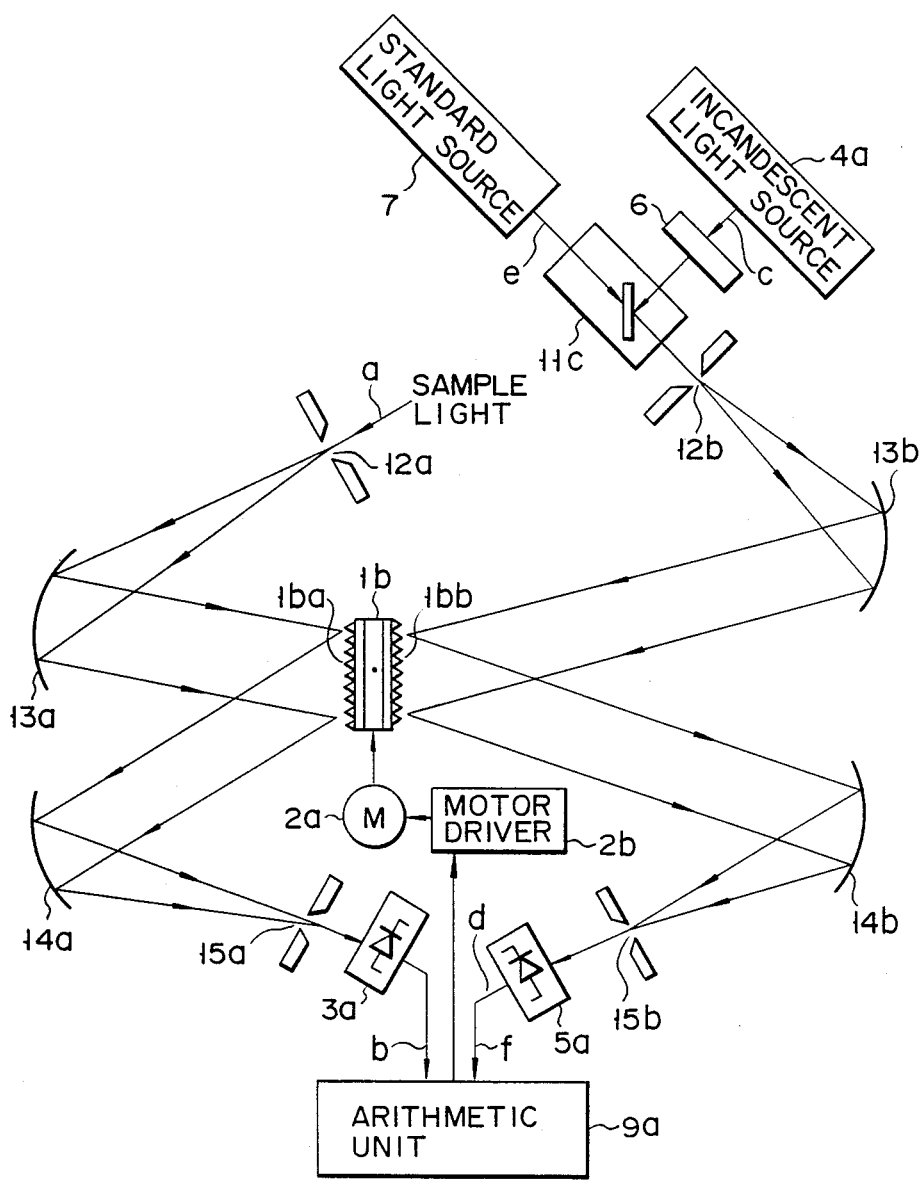
FIG. 16 is a block diagram showing a spectrometer which is a sixth embodiment of the present invention.

FIG. 16 schematically illustrates a spectrometer which is a sixth embodiment of the present invention. The same elements and the same components as those shown in FIG. 15 are designated with the same numerals in FIG. 16, and will not be described in detail.

As is evident from FIG. 16, the sixth embodiment is different from the fifth, in that sample light a, reference light c, and standard light e are applied in three different optical paths, respectively. More specifically, the sample light a is applied through the slit plate 12a, reflected by the collimator 13a, the diffraction 1ba, the collimator 14a, and applied via the slit plate 15a to the sample-light receiving device 3a. The device 3a converts the light a to a light-intensity signal b. The signal b is input to the arithmetic unit 9a. In the meantime, the reference light c emitted from the incandescent light source 4a is supplied through the etalon 6 to the light synthesizer 11c. The standard light e emitted from the standard light source 7 is also applied to the synthesizer 11c. The synthesizer 11c combines the reference light c and the standard light e. Both the light c and the light e are applied through the slit plate 12b, reflected by the collimator 13b, the diffraction grating 1bb, and the collimator 14b, and applied via the slit plate 15b to the standard-light receiving device 5a. The device 5a functions as a reference-light receiving device 8, too. It converts the reference light c and the standard light e to light-intensity signals d and f, respectively. Both signals d and f are input to the arithmetic unit 9a. The arithmetic unit 9a computes the spectral characteristic of the sample light a from the signals b, d, and f.

The sixth embodiment can achieve the same advantage as any embodiment described above. In addition, the optical systems for guiding the sample light a, the reference light c, and the standard light e can be more simple than their equivalents used in the other embodiment. This is because the optical paths of the three light beams are separated completely.

The present invention is not limited to the embodiments described above. The diffraction grating 1a used in some embodiments, and the interlocked diffraction grating 1b incorporated in some other embodiments can be replaced by any other dispersion-type spectral element such as a rotary prism or the like. Moreover, the etalon 6 used in all embodiments described above can be replaced by an etalon which comprises a piezoelectric plate. The equivalent thickness d of the piezoelectric etalon can be varied by changing the voltage applied on the piezoelectric plate, while the thickness d of the glass or quartz crystal plate of the optical etalon is, needless to say, invariable.

As has been described above, the spectrometer according to the present invention has an etalon which forms a wavelength scale, i.e., signals used as standard for determining the wavelength of sample light, from the reference light which consists of beams at various wavelengths over a broad range. Therefore, the spectrometer can determine the spectral characteristic of the sample light with high accuracy, even if the mechanism driving the dispersion-type spectral element has mechanical errors.

What is claimed is:

1. A spectrometer comprising:
   dispersion-type spectral element for reflecting incident sample light;
   a drive mechanism for rotating the spectral element;
   sample-light receiving means for receiving the sample light reflected by the spectral element and generating a first signal representing the intensity of the sample light;

a reference light source for applying reference light consisting of beams having various wavelengths over a broad range;

reference-light receiving means for receiving the reference light reflected by said spectral element and generating a second signal representing the intensity of the reference light;

an etalon located in an optical path extending from said reference light source to reference-light receiving means;

a standard light source for applying standard light consisting of only one beam having a known wavelength;

standard-light receiving means for receiving the standard light reflected by said spectral element and generating a third signal representing the intensity of the standard light;

means for directing said reference light and said standard light toward said spectral element to be reflected thereby; and calculating means for receiving the first, second and third signals separately, and obtaining from the second and third signals a wavelength scale used for calculating from the first signal the wavelength of the sample light.

2. The spectrometer according to claim 1, wherein said calculating means includes means for calculating the wavelengths at which the second signal has peaks, from the known standard wavelength determined by the third signal, thereby to obtain the wavelength scale.

3. The spectrometer according to claim 1, wherein said calculating means includes means for calculating the wavelength of the sample light from the position which a peak of the first signal takes with respect to the wavelength scale.

4. The spectrometer according to claim 1, wherein said sample-light receiving means and said standard-light receiving means are combined into one light receiving device.

5. The spectrometer according to claim 4, wherein said etalon is interposed between said spectral element and said reference-light receiving means.

6. The spectrometer according to claim 4, wherein said etalon is interposed between said reference light source and said spectral element.

7. The spectrometer according to claim 4, wherein said dispersion-type spectral element comprises a first dispersion-type spectral member and a second dispersion-type spectral member which have the same spectral characteristic.

8. The spectrometer according to claim 7, further comprising:

first light-guiding means for guiding the sample light to said first spectral member and for guiding the standard light from said standard light source to said first spectral member;

second light-guiding means for guiding the reference light from said reference light source to said second spectral member;

third light-guiding means for guiding the sample light and the standard light, both reflected by said first spectral member, to said light receiving device; and fourth light-guiding means for guiding the reference light, reflected by said second spectral member to said reference-light receiving means.

9. The spectrometer according to claim 8, wherein said etalon is interposed between said fourth light-guiding means and said reference-light receiving means.

10. The spectrometer according to claim 1, wherein said reference-light receiving means and said standard-light receiving means are combined into one light receiving device.

11. The spectrometer according to claim 10, wherein said dispersion-type spectral element comprises a first dispersion-type spectral member and a second dispersion-type spectral member which have the same spectral characteristic.

12. The spectrometer according to claim 11, further comprising:

first light-guiding means for guiding the sample light to said first spectral member;

second light-guiding means for guiding the reference light from said reference light source to said second spectral member and for guiding the standard light from said standard light source to said second spectral member;

third light-guiding means for guiding the sample light, reflected by said first spectral member, to said sample-light receiving means; and fourth light-guiding means for guiding the reference light and the standard light, both reflected by said second spectral member, to said light receiving device.

13. The spectrometer according to claim 12, wherein said etalon is interposed between said reference light source and said second light-guiding means.

* * * * *